(12) United States Patent
Del Giudice et al.

(10) Patent No.: US 10,387,054 B2
(45) Date of Patent: Aug. 20, 2019

(54) SECURE ELEMENT INCLUDING A NON-VOLATILE MEMORY AND METHODS FOR SAVING AND RESTORING DATA INCLUDING DEFRAGMENTING AND COMPRESSING DATA STORED IN OCCUPIED AND FREE REGIONS

(71) Applicant: SAFRAN IDENTITY & SECURITY, Issy-les-Moulineaux (FR)

(72) Inventors: Lauren Del Giudice, Issy les Moulineaux (FR); Anthony Fonteneau, Issy les Moulineaux (FR); Pierrick Bieules, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 0 days.

(21) Appl. No.: 15/585,066

(22) Filed: May 2, 2017

(65) Prior Publication Data
US 2017/0322742 A1 Nov. 9, 2017

(30) Foreign Application Priority Data
May 3, 2016 (FR) ...................... 16 53999

(51) Int. Cl.
*G06F 3/06* (2006.01)
*G06F 11/14* (2006.01)
(Continued)

(52) U.S. Cl.
CPC ............ *G06F 3/0619* (2013.01); *G06F 3/061* (2013.01); *G06F 3/065* (2013.01); *G06F 3/0641* (2013.01);
(Continued)

(58) Field of Classification Search
CPC ...... G06F 3/0619; G06F 3/061; G06F 3/0641; G06F 3/065; G06F 3/0679;
(Continued)

(56) References Cited

U.S. PATENT DOCUMENTS

| | | | | |
|---|---|---|---|---|
| 5,870,036 A | * | 2/1999 | Franaszek | H03M 7/3086 341/51 |
| 5,902,981 A | * | 5/1999 | Dethloff | G06K 7/0013 235/375 |
| 2002/0101367 A1 | * | 8/2002 | Geiger | H03M 7/30 341/51 |

FOREIGN PATENT DOCUMENTS

| | | |
|---|---|---|
| EP | 1067460 | 1/2001 |
| WO | WO-0108049 | 2/2001 |
| WO | WO-2015019484 | 2/2015 |

OTHER PUBLICATIONS

"French Preliminary Search Report," FR Application No. 1653999 (dated Oct. 24, 2016) (with English translation cover sheet), 8 pages.
(Continued)

*Primary Examiner* — Glenn Gossage
(74) *Attorney, Agent, or Firm* — Womble Bond Dickinson (US) LLP

(57) ABSTRACT

A secure element and method for backup of data stored in a non-volatile memory of the secure element. The method for backup of data includes de-fragmenting an area of the non-volatile memory so as to form, in the area, an occupied region and a free region. The method further includes compressing the portion of data contained in the occupied region, after de-fragmentation, and compressing the contents of the free region using a compression algorithm that is different from the one used for compressing the portion of data contained in the occupied region. In one embodiment, the occupied region is compressed using a dictionary, and
(Continued)

the free region is compressed by applying run-length encoding (RLE). The method also includes generating a backup image containing the compressed portion of data and the compressed contents of the free region, and writing the backup image into the nonvolatile memory. The area may contain objects to be handled by a program coded in an object language. Metadata for each area may also be generated and stored in the nonvolatile memory. A method of restoring data, including configuring the secure element in a busy mode to avoid corruption of the contents, and a method for resetting the secure element, are also disclosed.

11 Claims, 4 Drawing Sheets

(51) Int. Cl.
  *G06F 21/79* (2013.01)
  *G07F 7/08* (2006.01)

(52) U.S. Cl.
  CPC ........ *G06F 3/0679* (2013.01); *G06F 11/1469* (2013.01); *G06F 21/79* (2013.01); *G07F 7/082* (2013.01); *G06F 11/1453* (2013.01); *G06F 2201/84* (2013.01); *G06F 2212/401* (2013.01)

(58) Field of Classification Search
  CPC .. G06F 11/1469; G06F 21/79; G06F 11/1453; G06F 2201/84; G06F 2212/401; G07F 7/082
  See application file for complete search history.

(56) References Cited

OTHER PUBLICATIONS

"European Search Report," EP Application No. 17169162 (dated Sep. 7, 2017) (with English translation cover sheet), 7 pages.

* cited by examiner

SECURE ELEMENT INCLUDING A NON-VOLATILE MEMORY AND METHODS FOR SAVING AND RESTORING DATA INCLUDING DEFRAGMENTING AND COMPRESSING DATA STORED IN OCCUPIED AND FREE REGIONS

FIELD OF THE INVENTION

The present invention relates to the field of secure elements.

An object of the invention is providing methods for saving and restoring data in a secure element.

STATE OF THE ART

A secure element (SE) is a tamper-proof hardware platform capable of containing data in accordance with rules and safety requirements set by confident authorities.

A secure element comprises a non-volatile memory and a processor executing an operating system. Additional applications; for which the execution is controlled by the operating system, may be installed according to the goodwill of a user of the secure element.

Now, the writing of additional data in the non-volatile memory (for example an additional application) may compromise proper operation of the secure element.

Moreover, as the user of the secure element is the owner of its data, he/she may wish to be able to suppress the data in a secure way before reselling his/her secure element.

To overcome this problem, it is known how to proceed with saving of data contained in the non-volatile memory of the secure element to a trustworthy server ("TSM" server). The saved data may be subsequently restored in the non-volatile memory of the secure element by uploading these data from the trustworthy server. Restoration gives the possibility of reconfiguring the non-volatile memory of the secure element in the condition in which it was found at the moment when the saving was carried out; any modification carried out in a non-volatile memory between the saving and the restoration is deleted, for example data compromising proper operation of the secure element.

However, the method for saving and restoring data has the major drawback of having confidential data emerge outside the secure element, which represents a significant safety risk since a third party may intercept these confidential data.

DISCUSSION OF THE INVENTION

An object of the invention is to provide a method for saving and a method for restoring data in a secure element, giving the possibility of reducing the aforementioned safety risks.

According to a first aspect of the invention, a method for saving data stored in a non-volatile memory of a secure element comprises the steps of:
  generating a saved or backup image containing the data stored in the non-volatile memory,
  writing the saved image into the non-volatile memory of the secure element.

As the saved or backup image is written in the non-volatile memory from which the data to be saved originate, the saving is applied locally to the secure element. No datum to be saved leaves the secure element during this saving operation.

The saving process may further comprise the following features taken alone or as a combination when this is technically possible.

Generating the backup image may comprise compressing at least one portion of the data, which gives the possibility of reducing the space occupied by the saved or backup image in the non-volatile memory.

The compression may be applied on data localized in several predetermined areas of the non-volatile memory, so as to produce several compressed blocks, the generation of the backup image comprising a concatenation of the compressed blocks. In this way, the backup image is of a minimum size and consumes little space in the non-volatile memory of the secure element.

The method for saving or backup of data may comprise steps for:
  de-fragmenting of an area of the non-volatile memory containing at least one portion of the data to be saved so as to form, in the area, an occupied region containing the at least one portion of the data and a free region,
  compressing the portion of the data contained in the occupied region, after de-fragmentation.

Before de-fragmentation, the data to be saved are dispersed in the relevant area. The fact of applying de-fragmentation before the compression gives the possibility of concentrating the data to be saved in a region of reduced size (the occupied region), and therefore of improving the applied compression level.

The relevant area (and therefore the occupied region after its de-fragmentation) may contain objects intended to be handled by a program coded in an object language, and the objects to be compressed by a dictionary. Such a compression by a dictionary provides particularly high compression levels when it is applied to data comprising recurrent schemes or units and of small sizes, which is the case of such objects.

The compression dictionary may be generated from objects to be compressed. In this way, the storing of a preformed dictionary in the non-volatile memory of the secure element, which would consume memory space, may be avoided.

The method may further comprise compressing the contents of the free region using a different compression algorithm from the one used for compressing the portion of the data contained in the occupied region.

The compression of the contents of the free region comprises a coding by ranges (run-length encoding or RLE) of these contents. Such coding by ranges or run-length encoding applied to the free region provides a very high compression level.

The data to be saved may be contained in at least one predetermined area of the non-volatile memory. In this case, the method may comprise generating and storing in the non-volatile memory metadata comprising for each area, an address of the area.

The metadata may comprise, for at least one area, information on the integrity control of the at least one area, and a size of the at least one area.

The method for saving or backup of data may also comprise generating and storing in the non-volatile memory information on the integrity control of the metadata.

The method for saving or backup of data may also comprise generating and storing in the non-volatile memory information on the integrity control of the generated backup image.

According to a second aspect of the invention, a method for restoring data to a non-volatile memory of a secure element comprises
  reading a backup image stored in the non-volatile memory of the secure element, the backup image containing the data to be restored,
  writing in the non-volatile memory a copy of the data contained in the backup image.

The method for restoring data may comprise configuring the secure element in a busy mode wherein the secure element does not process an external command for physical restarting of the secure element. Such a configuration in the busy mode gives the possibility of avoiding corruption of the contents of the non-volatile memory during the restoration.

According to a third aspect of the invention, a method for resetting a secure element comprising a non-volatile memory storing data comprises saving the data using the method for saving according to the first aspect of the invention, and restoring saved data using the method for restoring according to the second aspect of the invention.

The non-volatile memory of the secure element may be integrated permanently into the secure element.

According to a fourth aspect of the invention, a computer program product comprises program code instructions for executing steps of the method according to the first aspect and/or the method according to the second aspect and/or the method according to the third aspect of the invention, when the program code instructions are executed by at least one processor.

According to a fifth aspect of the invention, a secure element comprising a non-volatile memory is provided, the secure element further comprising at least one processor configured for saving data stored in the non-volatile memory, the at least once processor being further configured for:
  generating a backup image containing the data stored in the non-volatile memory,
  writing into the non-volatile memory the backup image.

According to a sixth aspect of the invention, a secure element comprises a non-volatile memory, and at least one processor configured for restoring data to the non-volatile memory, the at least one processor being further configured for:
  reading a backup image contained in the non-volatile memory, the backup image containing the data to be restored,
  writing into the non-volatile memory a copy of the data contained in the backup image.

DESCRIPTION OF THE FIGURES

Other features, objects and advantages of the invention will become apparent from the following description, which is purely illustrative and non-limiting and which should be read with reference to the appended drawings wherein.

Throughout the figures, similar elements bear identical references.

DETAILED DESCRIPTION OF THE INVENTION

Figure 1:
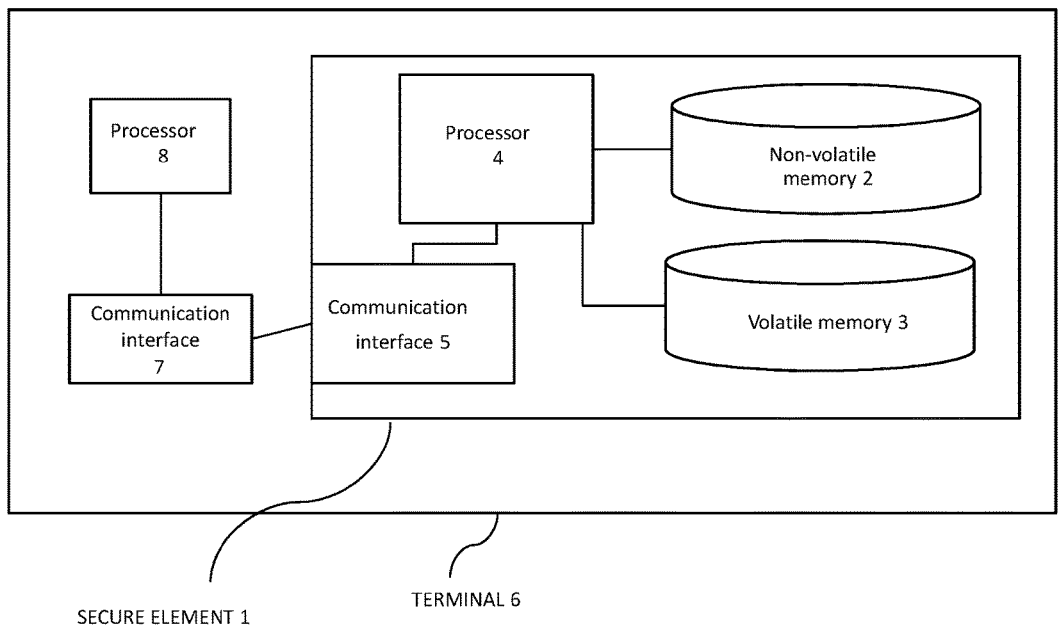
FIG. 1 schematically illustrates a secure element.

With reference to FIG. 1, a secure element 1 comprises a non-volatile memory 2, a volatile memory 3, at least one processor 4 and a communication interface 5 with a terminal 6.

The non-volatile memory 2 comprises one or several memory element(s). A memory element may be any type capable of storing data persistently in memory: flash, Electrically Erasable Programmable Read Only Memory (EEPROM), etc. Preferably, the non-volatile memory 2 is permanently integrated into the secure element 1 (in the sense that it is not removable).

The volatile memory 3 comprises one or several volatile memory unit(s) 3, for example of the Random Access Memory (RAM) type. The volatile memory 3 is able to store data temporarily. The volatile memory 3 is permanently integrated into the secure element 1 (in the sense that it is not removable).

The non-volatile memory 2 stores an operating system and at least one application coded in an object language. The operating system, or more simply the OS in the following, is configured for controlling the execution of each application of the secure element 1, when it is executed by the processor 4.

The non-volatile memory 2 also stores a backup program, and a restoration program, the operations of which will be described further on.

The processor 4 is configured for accessing the volatile memory 3 and the non-volatile memory 2, and for executing the OS, the applications, and the backup and restoration programs.

The processor 4 is moreover connected to the communication interface 5.

The secure element 1 assumes the shape of a chip card. The secure element is for example a smart card, an embedded Subscriber Identification Module (embedded SIM or eSIM), or embedded Secure Element (eSe). The element may be directly welded to the terminal 6.

The terminal 6 comprises a communication interface 7 for communicating with the communication interface 5 of the secure element 1. The terminal 6 comprises a suitable housing for receiving the secure element, and connections for being electrically connected to connections of the secure element.

The terminal 6 moreover comprises at least one processor 8 configured for executing at least one application, a so called "host" application, configured for communicating with the OS or an application executed by the processor of the secure element 1, via the communication interface 5. Generally, the terminal 6 comprises a plurality of host applications, for example an application controlling a biometric sensor of the terminal 6.

The terminal 6 is a user personal piece of equipment, such as a smartphone, a tablet, a telephone, etc.

Data Backup

One or several area(s) of the non-volatile memory 2, containing data to be saved, are predetermined. These areas are subsequently called "source areas". The source areas may not be contiguous in the non-volatile memory 2.

Figure 2:
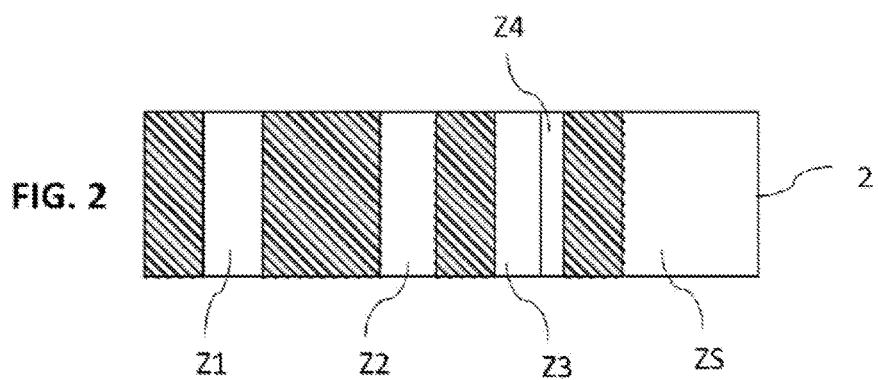
FIG. 2 schematically illustrates the contents of a non-volatile memory of a secure element.

In the example illustrated in FIG. 2, the non-volatile memory 2 comprises four source areas $Z_i$, i ranging from 1 to 4.

The address of the beginning in the non-volatile memory 2 of each source area Zi is predetermined, as well as the size of the source area and/or its end address.

A backup area ZS is also predetermined in the non-volatile memory 2, different from the source areas.

The data to be saved comprise useful data written in the non-volatile memory 2 by the OS. A source area containing useful data of the OS, described subsequently by "source area of the OS", is typically accessible in reading and in writing by the OS (as opposed to an accessible read only area comprising the binary of the actual operating system, and which is not a source area, i.e. an area the contents of which is to be saved). In the example illustrated in FIG. 2, the areas Z1 and Z2 are source areas of the OS.

The data to be saved also comprise "application" data, i.e., data handled by at least one application of the secure element 1. The source areas containing application data are described subsequently as "application source areas".

At least one application source area is or contains an object heap. When an application coded in an object language is executed by the processor 4 of the secure element 1, this application may write objects in the corresponding object heap, access them later by reading, and deleting them from the object heap.

The object heap may be shared by several applications coded in the same object language. In the example illustrated in FIG. 2, the areas Z3 and Z4 are application source areas. Both of these areas, contiguous areas, in reality form a single area comprising the object heap (subsequently it will be seen that both of these areas Z3 and Z4 are processed differently during the backup).

In a particular embodiment, the operating system is JAVA Card and the object language is the JAVA language. An object heap is allocated in the non-volatile memory 2 for all the applications coded in JAVA Card.

Figure 3:
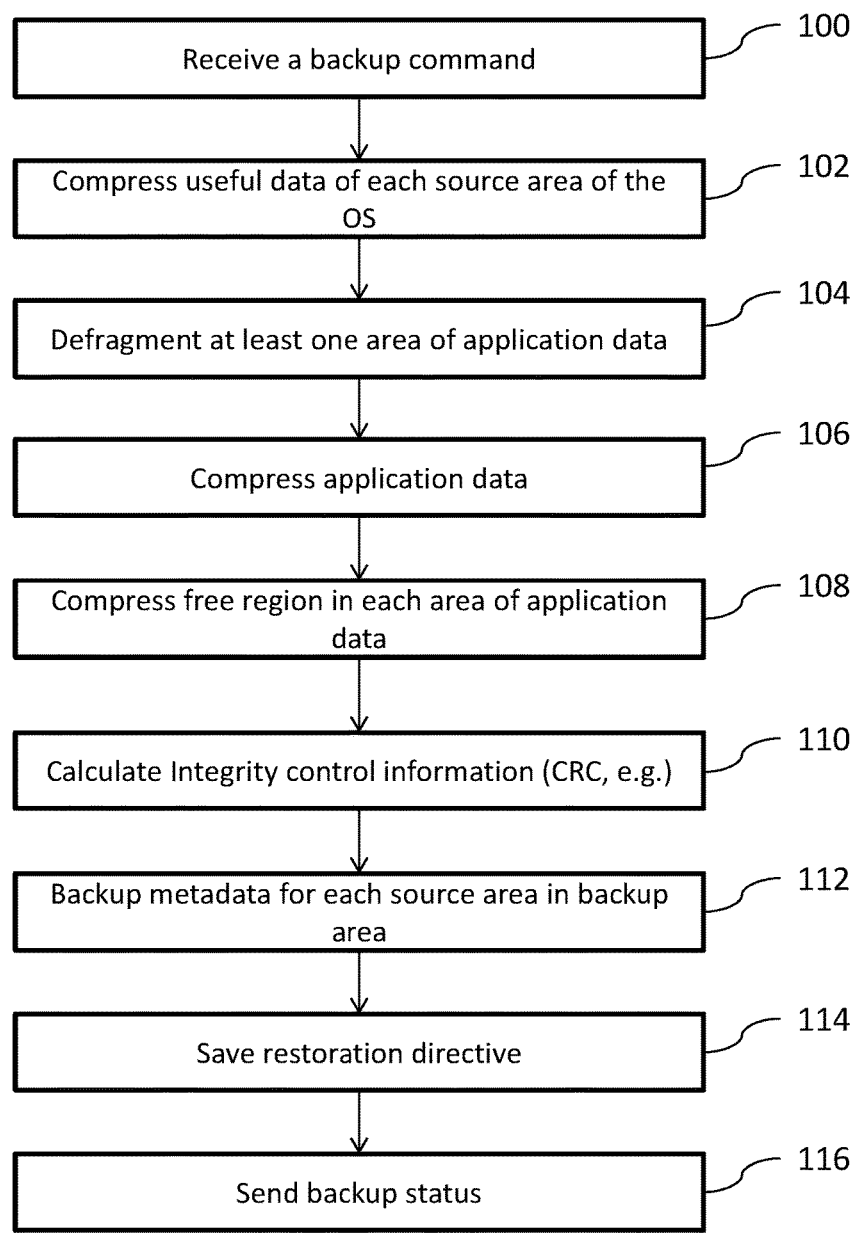
FIG. 3 is a flow chart of steps of a method for saving data stored in memory in a secure element, according to an embodiment of the invention.

With reference to FIG. 3, a backup of the data contained in the source areas Z1 to Z4 comprises the following steps.

The processor 8 of the terminal 6 generates a backup command and sends it to the secure element 1 via the communication interfaces 7 and 5. The command is for example of the APDU (Application Protocol Data Unit) type.

The backup command is received, at step 100, by the communication interface 5, which transmits the command to the processor 4 so that it is processed by the backup program.

The backup program compresses at step 102 the contents of each source area of the OS.

The compression step 102 comprises the allocation, in the volatile memory 3, of a compression buffer, used for temporarily storing the input data to be compressed and the compressed output data. The buffer is of a set and predetermined size. This size is independent of the size of the data to be compressed.

The compression step 102 uses a compression algorithm by a dictionary.

In a way known per se, a compression algorithm by a dictionary proceeds with searching for similarities between the data to be compressed and a set of strings contained in a data structure called a "dictionary". When a similarity is found, the corresponding datum is replaced by a reference to the location of this string in the dictionary. The use of a compression algorithm by a dictionary provides excellent compression levels. Such an algorithm is therefore of particular interest for secure elements having limited storage capacity.

In particular, a compression algorithm by a dictionary provides particularly high compression levels when it is applied to data comprising current schemes or patterns and small sizes. This is the case of data contained in the source areas of the OS or of the applications.

The compression step 102 comprises the generation of a compression dictionary. Usually, such a dictionary is made up beforehand. In the present method, the dictionary is on the contrary made up gradually during the compression step 102, and this from the data to be compressed themselves. More specifically, the compression step 100 comprises a search for repetitive patterns in the data to be compressed contained in the different source areas of the OS. When a recurrent pattern is detected, it is added to the dictionary.

Preferably, a compression algorithm by a sliding dictionary is used for the compression step 102. In this case, the search for recurrent patterns and the coding of the data in a compressed format are concomitant; the dictionary is dynamically built from the data to be compressed themselves.

In order to further improve the efficiency of the compression algorithm, the source areas are virtually concatenated in the allocated buffer so that the algorithm only sees a single block of contiguous data. By virtually concatenating the areas during the compression, the dictionary is not empty at the beginning of the compression of the second source area but stems from the contents of the first source area.

Having a dictionary generated from the actual data gives the possibility of not loading onboard an additional dictionary and potentially poorly adapted. Also, the fact of building the dictionary using the data to be compressed, like in the case of a sliding dictionary, has the advantage of not having to store a predetermined dictionary in the non-volatile memory 2. This allows minimum consumption of the non-volatile memory 2, and an optimal compression level.

The compression step 102 produces a compressed block of compressed data, which is written in the backup area ZS defined in the non-volatile memory 2.

Figure 5:
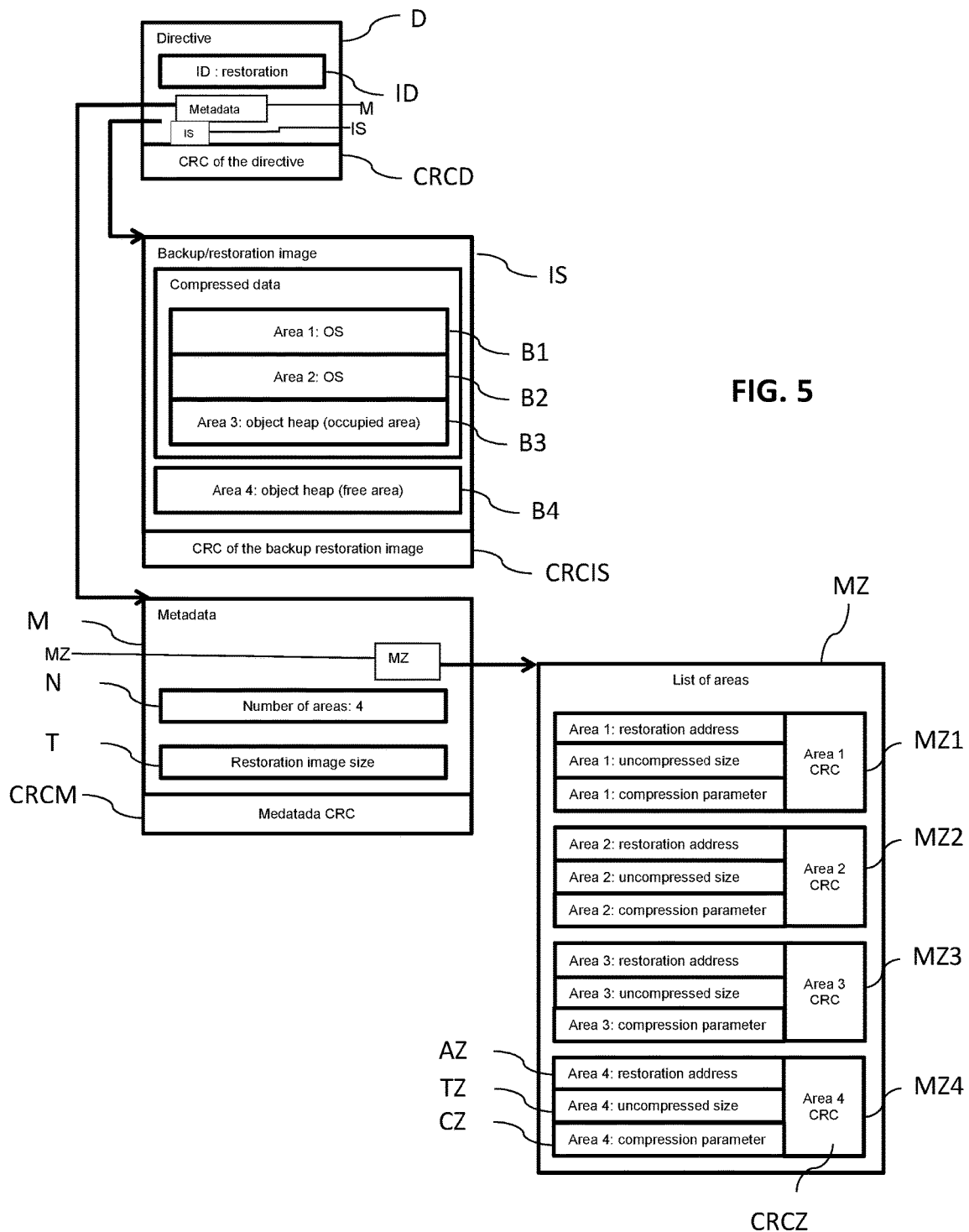
FIG. 5 illustrates the contents of a backup image IS generated by the backup method for which the steps are shown in FIG. 3.

The compression step 102 is applied to each of the source areas of the OS Z1 and Z2. With reference to FIG. 5, two corresponding compressed blocks B1 and B2 are produced.

The compressed blocks B1 and B2 are concatenated in the backup area ZS so as to minimize the space occupied by the whole of the compressed blocks in this backup area ZS.

Moreover, the backup program launches a de-fragmentation step 104 wherein at least one source area containing data of applications to be saved is de-fragmented. The de-fragmentation is typically applied by a de-fragmentation program of the OS.

In a way known per se, the de-fragmentation step 104 displaces the data of applications contained in each source area in the non-volatile memory 2, so as to further group them together. Thus, at the end of the fragmentation step 104, each source area of data of applications to be saved consists, in the non-volatile memory 2, of two contiguous regions, an occupied region containing all the data to be saved, and a free region not containing any datum.

The areas Z3 and Z4 illustrated in FIG. 2 are in reality the occupied region and the free region, respectively, formed at the end of the de-fragmentation of the source area formed by the union of areas Z3 and Z4.

For each source de-fragmented area of application data, the beginning address and the size of each of the two regions of the source area formed (occupied and free) are stored in the volatile memory 3.

For each source area of data of applications, the backup program compresses at step 106 the application data grouped in the occupied region Z3 of the source area.

The compression step 106 is applied identically with the compression step 102, for each relevant area of data of applications to be saved, possibly with a compression algorithm by a sliding dictionary.

Each produced compressed block at the end of the compression step 106 is concatenated with the compressed block(s) produced at the end of the compression step 102, in the backup area ZS of the non-volatile memory 2.

The objects contained in the occupied region Z3 of the object heap are therefore compressed, at step 106, so as to produce the compressed block B3, which is concatenated with the blocks B1, B2.

The objects are each a small size header and which varies not very much from one object to the other. Thus, the compression of the objects using a compression algorithm by dictionary produces particularly high compression levels.

Moreover, for each source area of data of applications, the backup program compresses, at step 108, the contents of the free region formed in the source area, even though not containing any datum or occupied by data. In the example of FIG. 2, there is only one free region Z4 concerned by the compression step 108.

The compression algorithm used for the compression step 108 of the contents of the free region Z4 is different from the one used for the compression step 106 of the data contained in the occupied region Z3.

Very advantageously, a coding by ranges (run-length encoding or RLE) is used for the compression step 108.

Generally, a particular pattern is written in order to notify that a memory unit is free, i.e. not occupied by data (for example, a free region only contains the pattern 0xFF in each of its bytes). Run-length encoding is therefore highly efficient for compressing the free region Z4: indeed it is sufficient to indicate the value of the "free" particular pattern and the number of times it is repeated in the free region Z4.

De-fragmentation, at step 104, gives the possibility of improving the accumulated compression level of the compression steps 106 and 108, since at the end of the de-fragmentation, the size of the occupied region Z3 is reduced and the size of the free region Z4 is enlarged.

The compressed block—or the run-length encoding—B4 produced at the end of the compression 108 is concatenated with the compressed blocks B1, B2, B3 in the backup area ZS of the non-volatile memory 2.

The different compressed blocks B1 to B4 resulting from the compression steps 102, 106 and 108 and concatenated in the backup area ZS of the non-volatile memory 2 form together a backup image IS.

Further, the backup program calculates, at step 110, information on the integrity control relative to at least one portion of the data. A piece of control information is for example a cyclic redundancy code (CRC) relating to a portion of the data.

Integrity control data CRCZ is calculated for each source area Zi. Each piece of integrity control information CRCZ is calculated on the contents of each area Zi before their compression.

Metadata M relative to the source areas Zi for which the contents were saved in the backup image IS are also stored, at step 112, in the backup area ZS of the non-volatile memory 2, in addition to the backup image IS. The metadata M comprise:

the number N of source areas Zi of the non-volatile memory 2 having been subject to a backup (4 in the example of FIG. 3), for each source area Zi of index i ranging from 1 to N, a source area descriptor MZi, the size T of the backup image IS generated in the backup area ZS, integrity control data CRCM relative to the metadata M, calculated according to the preceding description of step 110.

The source area descriptor MZi associated with each source area Zi comprises:

the address AZ of the source area Zi, the size TZ of the source area Zi (before compression), at least one compression parameter CZ used for compressing the data contained in the source area Zi, for example, a field indicating the type of compression algorithm used for compressing the source area Zi (run-length encoding for the free region Z4 of the object heap, compression by dictionary for the other areas Z1, Z2, Z3, in the embodiment of FIG. 2).

the piece of integrity control information CRCZ relatively to the source area (before compression); calculated during step 110.

Each source area descriptor MZi therefore relates to a compressed block Bi contained in the backup image IS. For example, the order of the MZi descriptors in the metadata M corresponds to the order of the compressed blocks Bi concatenated in the backup image IS.

Further, the backup program generates and stores or saves, at step 114, a restoration directive D in the backup area ZS. The restoration directive D is encoded so as to be integrated in a directive interpreter, not necessarily limited to a restoration operation.

Referring to FIG. 5, the restoration directive D comprises:

a single restoration identifier ID specific to the directive; this identifier is intended to be read by an interpreter.

the metadata M or the address of the metadata M, the backup image IS or the address of the backup image IS, integrity control data CRCD relatively to the restoration directive D, calculated according to the preceding description of step 110.

The backup program sends back to the terminal 6 (FIG. 1) via the communication interface 5 a status indicating that the backup is finished.

The contents written into the backup area ZS is illustrated in FIG. 5.

Data Restoration

Figure 4:
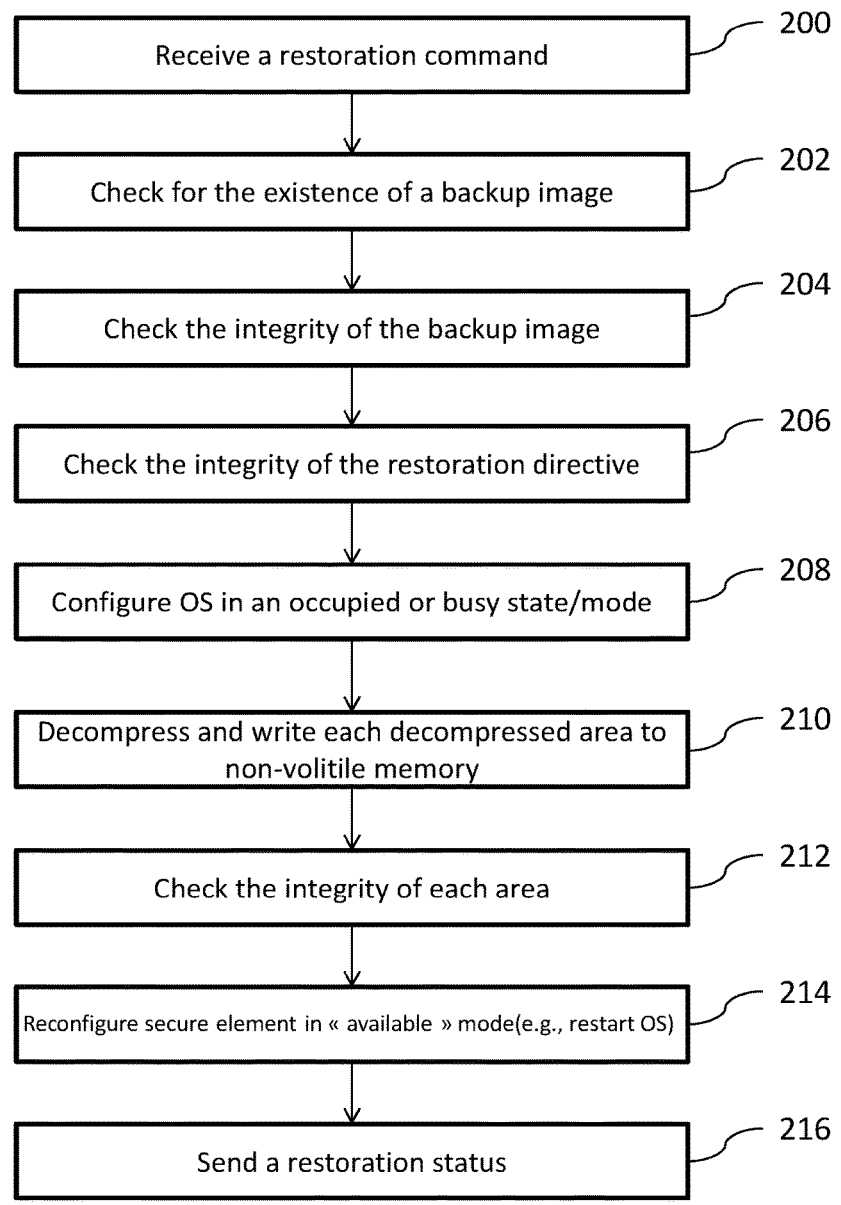
FIG. 4 is a flow chart of steps of a method for restoring data towards a secure element, according to an embodiment of the invention.

With reference to FIG. 4, the saved data are restored in the non-volatile memory 2 using the following steps.

The processor 8 of the terminal 6 (shown in FIG. 1) generates a restoration command and sends it to the secure element 1 via the communication interfaces 7 and 5. The command is for example of the ADPU type.

The restoration command is received, at step 200, by the communication interface 5, which transmits the command to the processor 4 so that it is processed by a restoration program. The restoration program comprises or uses an interpreter capable of reading the contents of the restoration directive D.

The restoration program checks, at step 202, the existence of a backup image IS in the backup area ZS.

If no backup image IS is found in the backup area ZS, an error message is returned to the terminal 6 via the communication interface 5, and the restoration finishes.

Otherwise, the restoration program checks, at step 204, the integrity of the backup image IS. To do this, the restoration program checks that the value of the integrity control information CRCIS of the backup image IS is consistent with the contents of the backup image IS.

If the restoration program considers that the backup image IS is not intact, an error message is returned to the terminal 6 via the communication interface 5, and the restoration finishes.

Otherwise, the restoration program checks, at step 206, the integrity of the restoration directive D. To do this, the restoration program checks that the value of the integrity control information CRCD of the restoration directive D is consistent with the contents of the restoration directive D.

If the restoration program considers that the restoration directive D is not intact, an error message is returned to the terminal 6 via the communication interface 5, and the restoration finishes. This may occur notably after an external attack has corrupted the contents of the restoration directive D.

Otherwise, the restoration program reconfigures, at step 208, the secure element 1 in a busy mode. In the busy mode, the OS does not process all or part of the external commands from the terminal 6 which are received by the secure element 1 via the communication interface 5.

For example, in the busy mode, the OS is configured so as to not process an application external command of the secure element 1. In this case, the OS is limited to sending back to the terminal 6 a message indicating the configuration is in the busy mode.

Moreover, the restoration program checks the integrity of the metadata M. To do this, the restoration program checks that the value of the integrity control information CRCM of the metadata M is consistent with the contents of the metadata M.

If the restoration program considers that the metadata M are not intact, an error message is returned to the terminal 6 via the communication interface 5, and the restoration finishes. This may occur notably after an external attack has corrupted the contents of the metadata M.

Otherwise, the restoration program decompresses, at step 210, each compressed block contained in the backup image IS.

For each compressed block Bi, i ranging from 1 to N, the restoration program reads the source area descriptor MZi associated with this compressed block Bi. The decompression algorithm used for decompressing the compressed block is inferred from the compression parameter CZ contained in the descriptor MZi associated with the block Bi.

The contents of the block Bi is written, after decompression, into the non-volatile memory 2 at the address AZ indicated in the area descriptor MZi.

Preferably, the compression algorithm used during the backup is of the asymmetrical type: in this case, the compression is performed in terms of yield but relatively slow, while the decompression is fast.

In a similar way to the compression, the decompression step 210 comprises the allocation of a decompression buffer in the volatile memory 3. The decompression buffer is in the volatile memory 3 for promoting the rapidity of the decompression operation.

The decompression buffer is coupled with an output buffer with the size of a page of the non-volatile memory 2.

During decompression, at step 210, the restoration program reads the data contained in the backup image IS and copies them into the decompression buffer. The result of the decompression of each compressed block is temporarily stored in the allocated output buffer. Once the output buffer is full, its contents are copied into a page of the non-volatile memory 2. The use of this additional buffer gives the possibility of not stressing the non-volatile memory 2 during the writing of the decompressed data. It provides better endurance of the product in the case of a frequent restoration operation.

In order to decompress a block which was compressed using a run-length encoding, a writing into non-volatile memory 2 may be directly made. The restoration program reads, in the relevant block of the backup image IS, the value of the recurrent pattern which was found in the free region, as well as the number of its occurrences in the free region, in order to proceed with the writing of the pattern.

The OS sends back a successful status to the terminal 6 in order to inform it on the course of the operation.

At the end of the decompression step, the same source areas Z1 to Z4 are assumed to have the same contents as before the compressions applied during the backup. Any modification of the contents of a source area, between the end of the backup and the beginning of the restoration has been deleted.

The restoration program checks, at step 212, the integrity of each source area thereby restored. To do this, the restoration program checks that the value of the integrity control information CRCZ contained in the descriptor Zi of a given area and associated with the compressed block Bi corresponds to the contents which was re-written into the non-volatile memory 2 at the address AZ indicated in the first descriptor Zi.

If the restoration program considers that a rewritten area Zi in the non-volatile memory 2 is not intact, an error message is returned to the terminal 6 via the communication interface 5, and the restoration finishes. This may notably occur after an external attack has corrupted the contents of the backup image IS.

If the restoration program considers that all the rewritten source areas Z1 to Z4 have intact contents, then these areas have been restored successfully.

The restoration program reconfigures the secure element 1 in an "available" (not busy) mode in which the external commands received by the secure element 1 may be processed by the OS.

The restoration program sends back, at step 216, to the terminal 6 a status indicating that the restoration took place successfully.

The reconfiguration in the "available" mode for example comprises a complete restarting, at step 214, of the OS (hardware reset). In this case, the sending of the status is carried out with this complete restarting.

The restoration operation endangers the data of the OS and the application data. The applications are themselves in an unstable state during the restoration. The configuration of the secure element 1 in the busy mode during restoration gives the possibility of protecting the secure element 1 against corruption of the non-volatile memory 2 generated by the execution of an external command during restoration.

However, it may happen that the secure element 1 is accidentally disconnected during the restoration. An independent mechanism of the OS of the "roll forward" type is used for guaranteeing the atomicity and the security of the restoration. A begun restoration will resume even after a cut off of the current. There will be no corruption in the case of a loss of power supply.

In the case of a current loss which occurs after switching the OS into the busy mode, the OS will restart in the same dedicated state, and will resume the restoration of the image from the start. This mechanism will therefore guarantee the atomicity of the restoration.

Secure Element Factory Reset

Generally, three different actors intervene on a secure element 1:

The supplier, which manufactures the secure element 1.

The transmitter, which defines a minimal set of data allowing proper operation of the secure element 1. The minimum set of data thus comprises the binary of the OS, and optionally at least one application approved by the transmitter. When the non-volatile memory 2 only contains this minimum set of data, conventionally it is stated that the secure element 1 is in an "ex-works" state.

From among the third parties which access in reading and/or writing to the non-volatile memory 2, the third parties may comprise:

a final user, which uses the functionalities provided by the secure element 1, and/or other actors, triggering remote installations of applications in the non-volatile memory 2 (for example by Over-The-Air, or OTA).

The backup and restoration methods, described earlier, advantageously find application for factory resetting a secure element 1.

The backup is thus for example applied once by the transmitter, while the secure element 1 is in its ex-works state. Preferably, the backup function is not made accessible to the final user.

Later on, the final user uses the secure element 1 (for example, with his/her personal terminal 6), which has the effect of writing additional data into the non-volatile memory 2.

The restoration function is made accessible to the final user of the secure element 1, i.e. the terminal 6 of the user is configured so as to allow this user to trigger the sending of the restoration command to the secure element 1.

The user may trigger such a restoration in the case of an abnormal behavior of the secure element 1, and this without assistance from the supplier, or else when he/she decides to transfer his/her secure element 1 to a third party (all of his/her personal data are deleted from the restoration in the ex-works state.

If additional un-approved applications have been installed after the backup in one of the source areas of the non-volatile memory 2 of the secure element 1, then the restoration deletes the contents of the source areas, which deletes any additional un-approved application contained in one of these source areas.

The secure element 1 is then factory reset.

The use of an asymmetrical compression algorithm is advantageous, since the backup is only to be implemented or applied by the transmitter, while the restoration may be applied multiple times. The high compression yield of such an algorithm gives the possibility of defining a relatively reduced backup area ZS, and the final user does not have to undergo the inconveniences of a long restoration, the decompression being fast.

The backup/restoration of the secure element 1 does not require any modification of the OS, or any input datum. This gives the possibility to the supplier of the secure element 1 of being autonomous in order to define a backup image IS with his/her minimum set of applications. This gives him the possibility of handling alone the deployment of his/her product in the field. The autonomy to which we refer here is relative to the provider of the OS.

The restoration may be carried out in a hostile environment without any risk of compromising the security of the product. In particular, no datum to be saved enters or emerges from the secure element 1 during the backup or the restoration, which are applied locally to the secure element 1, which is a guarantee of security.

The invention claimed is:

1. A method for backup of data stored in a non-volatile memory of a secure element, wherein the method comprises steps of:
de-fragmenting an area of the non-volatile memory containing at least one portion of data to be saved so as to form, in the area, an occupied region containing the at least one portion of data and a free region,
compressing the at least one portion of data contained in the occupied region using a compression algorithm by dictionary, after de-fragmentation,
compressing the contents of the free region by applying a run-length encoding of the contents,
generating a backup image containing the compressed at least one portion of data contained in the occupied region and the compressed contents of the free region, and
writing the backup image into the non-volatile memory of the secure element.

2. The method according to claim 1, wherein the compressing is applied on localized data in several predetermined areas of the non-volatile memory, so as to produce several compressed blocks, the generation of the backup image comprising a concatenation of the compressed blocks.

3. The method according to claim 2, wherein the area contains objects to be handled by a program coded in an object language, and wherein the objects are compressed using the dictionary.

4. The method according to claim 3, wherein the method further comprises generating the dictionary from the objects to be compressed.

5. The method according to claim 1, wherein the data to be saved are contained in at least one predetermined area of the non-volatile memory, and wherein the method further comprises generating and storing in the non-volatile memory metadata comprising, for each area, an address of the area.

6. The method according to claim 5, wherein the metadata comprise integrity control information of the at least one predetermined area, or a size of the at least one predetermined area.

7. The method according to claim 6, wherein the method further comprises generating and storing in the non-volatile memory integrity control information of the metadata.

8. The method according to claim 7, wherein the method further comprises generating and storing in the non-volatile memory integrity control information of the generated backup image.

9. A method for resetting a secure element comprising a non-volatile memory storing data, the method comprising:
saving data using the method according to claim 1,
restoring the saved data.

10. A computer program product comprising a non-volatile memory having stored therein code instructions of a program for executing the steps of the method according to claim 1, when the code instructions are executed by at least one processor.

11. A secure element comprising:
a non-volatile memory, and at least one processor configured for saving data stored in the non-volatile memory, by performing operations including:

de-fragmenting an area of the non-volatile memory containing at least one portion of data to be saved so as to form, in the area, an occupied region containing the at least one portion of data, and a free region, compressing the at least one portion of data contained in the occupied region using a compression algorithm by dictionary, after de-fragmentation, compressing the contents of the free region by applying a run-length encoding of the contents, generating a backup image containing the compressed at least one portion of data contained in the occupied region and the compressed contents of the free region, and writing into the non-volatile memory the backup image.

* * * * *